United States Patent [19]
Bigolin

[11] Patent Number: 5,387,024
[45] Date of Patent: Feb. 7, 1995

[54] SADDLE FOR SPORT BICYCLES

[76] Inventor: Giuseppe Bigolin, Via Aldo Moro, 7, 36028 - Rossano Veneto (Vicenza), Italy

[21] Appl. No.: 168,017

[22] Filed: Dec. 15, 1993

[30] Foreign Application Priority Data

Dec. 16, 1992 [IT] Italy .............. MI92 U 001067

[51] Int. Cl.$^6$ .............................................. B62J 1/00
[52] U.S. Cl. ............................. 297/202; 297/215.16
[58] Field of Search ............... 297/195.1, 202, 201, 297/215.16

[56] References Cited

U.S. PATENT DOCUMENTS

| 568,626 | 9/1896 | Pierce et al. | 297/202 |
| 574,503 | 1/1897 | Van Meter | 297/202 X |
| 576,969 | 2/1897 | Hunt | 297/202 |
| 612,972 | 10/1898 | Leech | 297/202 |
| 4,098,537 | 7/1978 | Jacobs | 297/215.16 |
| 5,165,752 | 11/1992 | Terry | 297/202 X |

FOREIGN PATENT DOCUMENTS

| 327904 | 7/1936 | Italy | 297/195.1 |
| 4577 | of 1896 | United Kingdom | 297/202 |

Primary Examiner—Peter R. Brown
Attorney, Agent, or Firm—Bucknam and Archer

[57] ABSTRACT

An improved saddle for sport bicycles includes a saddle framework made of a plastic material, covered by a coating material and supported by a curved tubular metal element, to the framework being connected a rear connecting portion or bridge element, the frame, at a rear central portion thereof, further including a slot having a set width.

The framework is moreover provided, at its front portion, with a cavity in which a bellows element can be arranged.

2 Claims, 3 Drawing Sheets

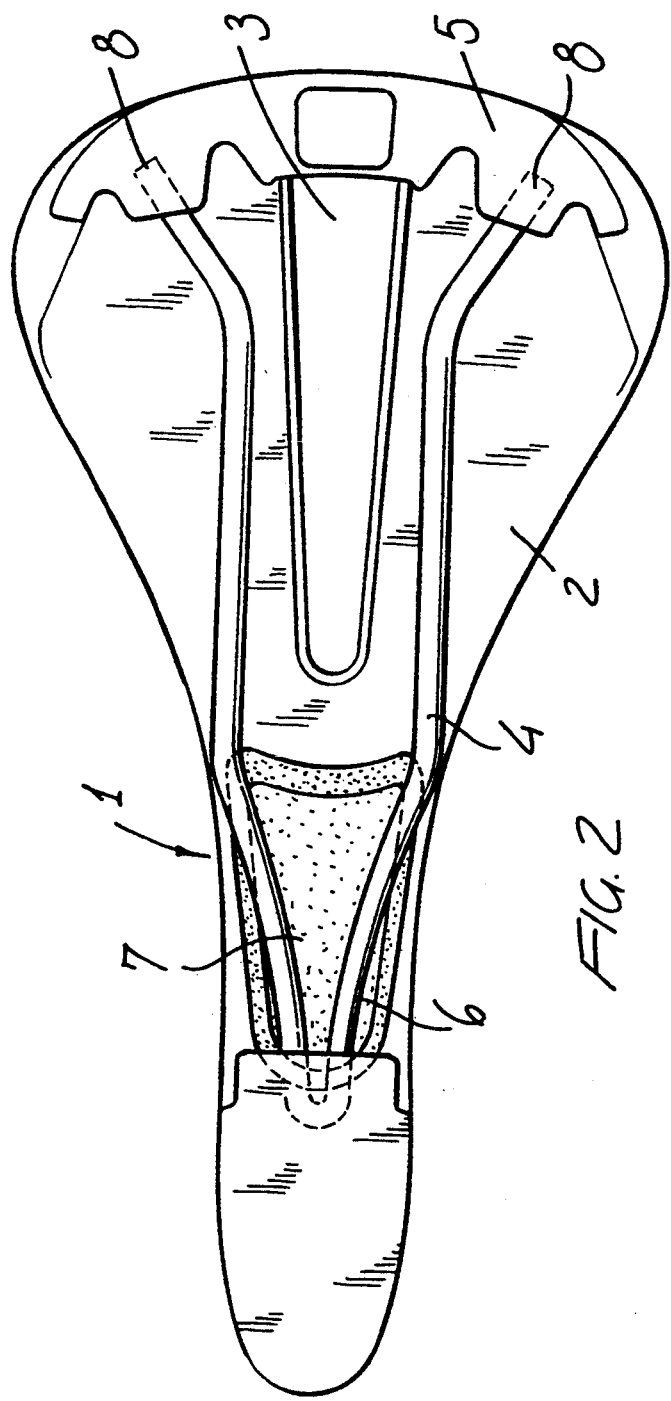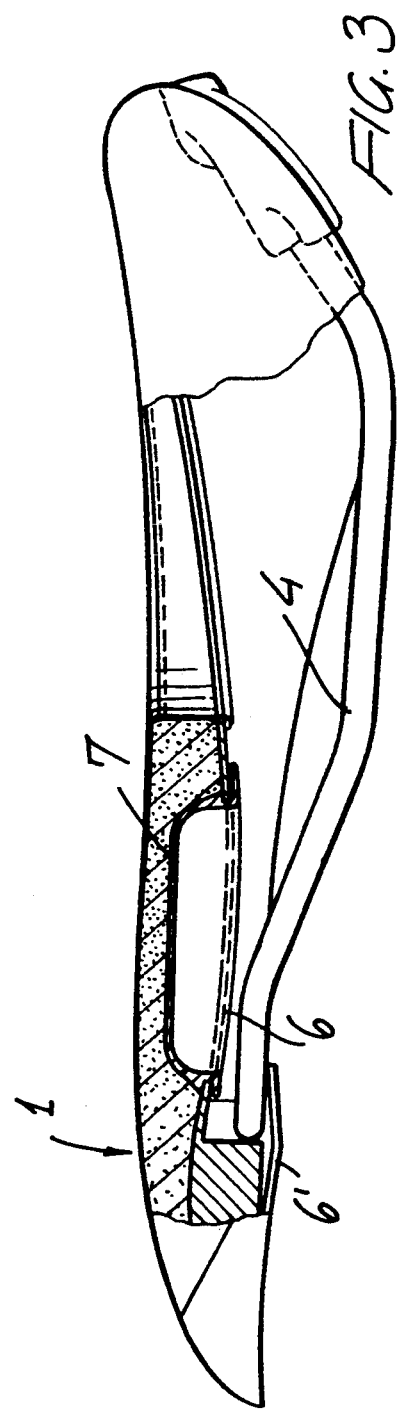

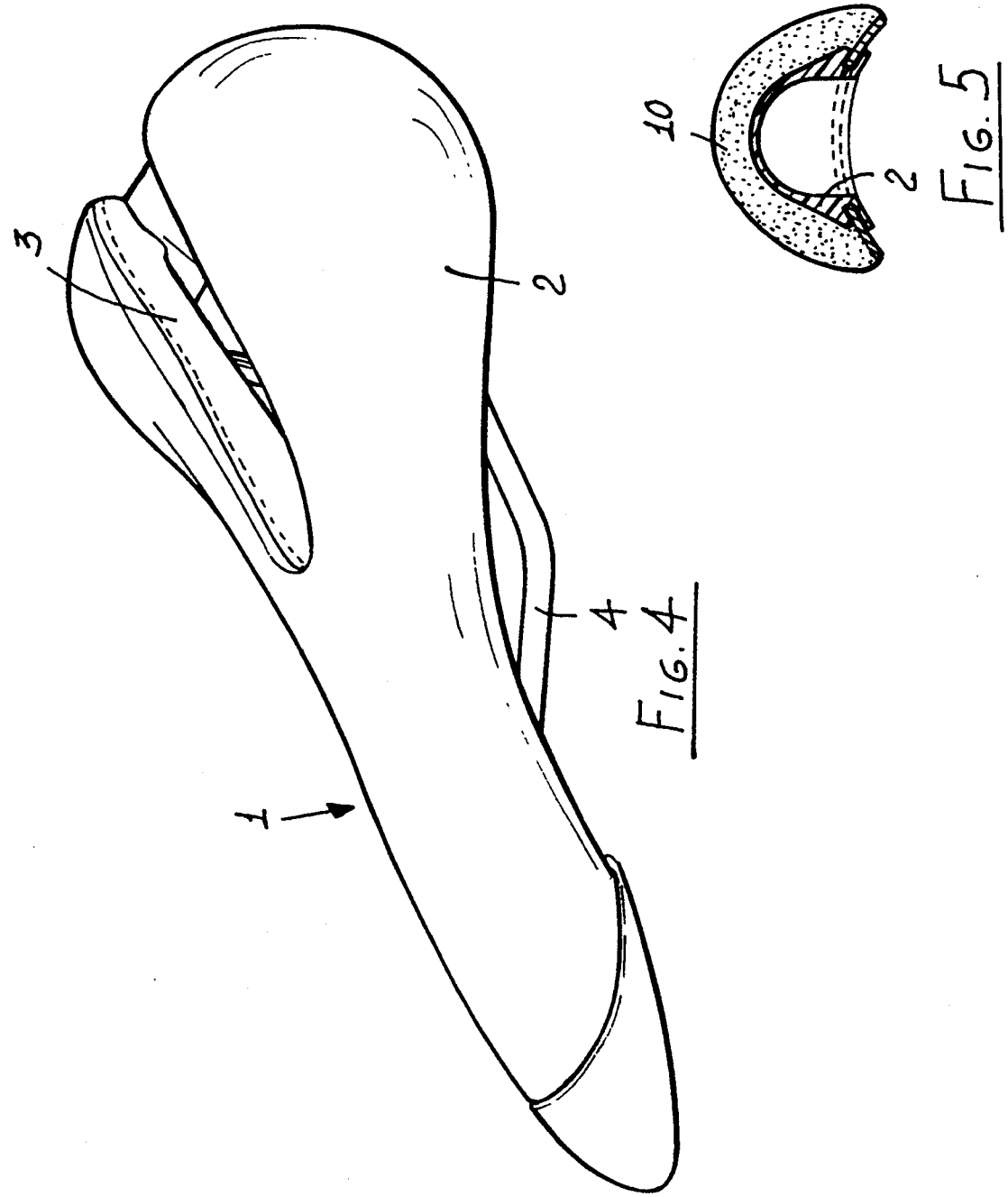

SADDLE FOR SPORT BICYCLES

BACKGROUND OF THE INVENTION

The present invention relates to an improved saddle construction, which has been specifically designed for application to a sport bicycle.

As is known, there are commercially available a lot of saddles for sport bicycles.

Usually, these saddles are made in a single piece of a plastic or the like material, having an elongated and contoured shape, and are supported on a metal supporting element which is in turn connected to the frame of the bicycle.

At present, the great stifness and large weight of these prior saddles cause great drawbacks with respect to the cyclist's comfort.

In particular, the bicycle saddles of the above mentioned type do not allow air to circulate in an optimum manner, thereby causing a comparatively great perspiration by the cyclist, which represents a source of drawbacks during the practicing of sport activities.

SUMMARY OF THE INVENTION

Accordingly, the main object of the present invention is to overcome the above mentioned drawbacks, by providing an improved bicycle saddle which has a very small weight and is highly resilient while providing a good circulation of air.

Another object of the present invention is to provide such an improved bicycle saddle which is very reliable and safe in operation and, moreover, can be easily made starting from easily commercially available elements and materials.

Yet another object of the present invention is to provide such a bicycle saddle which is very competitive from a mere economic standpoint.

According to one aspect of the present invention, the above mentioned objects, as well as yet other objects, which will become more apparent hereinafter, are achieved by an improved saddle for sport bicycles, comprising a plastic material framework covered by a coating material and supported by a curved tubular metal element, characterized in that said saddle further comprises, connected to said framework, a rear connecting portion and that, at a central rear portion thereof, said framework includes a slot of a set width, whereas, at a front portion thereof, said framework is provided with a cavity in which a bellows element can be engaged.

BRIEF DESCRIPTION OF THE DRAWINGS

Further characteristics and advantages of the present invention will become more apparent hereinafter from the following detailed disclosure of a preferred, though not exclusive, embodiment of a bicycle saddle according to the present invention which is illustrated, by way of an indicative, but not limitative, example, in the figures of the accompanying drawings, where:

FIG. 2 is a bottom view illustrating the improved saddle according to the present invention;

FIG. 3 is a side elevation view, as partially cross-sectioned, of the bicycle saddle according to the invention;

FIG. 4 is a perspective view of the saddle according to the invention; and

FIG. 5 is a front cross-section view of the saddle according to the invention.

DESCRIPTION OF THE PREFERRED EMBODIMENT

Figure 1:
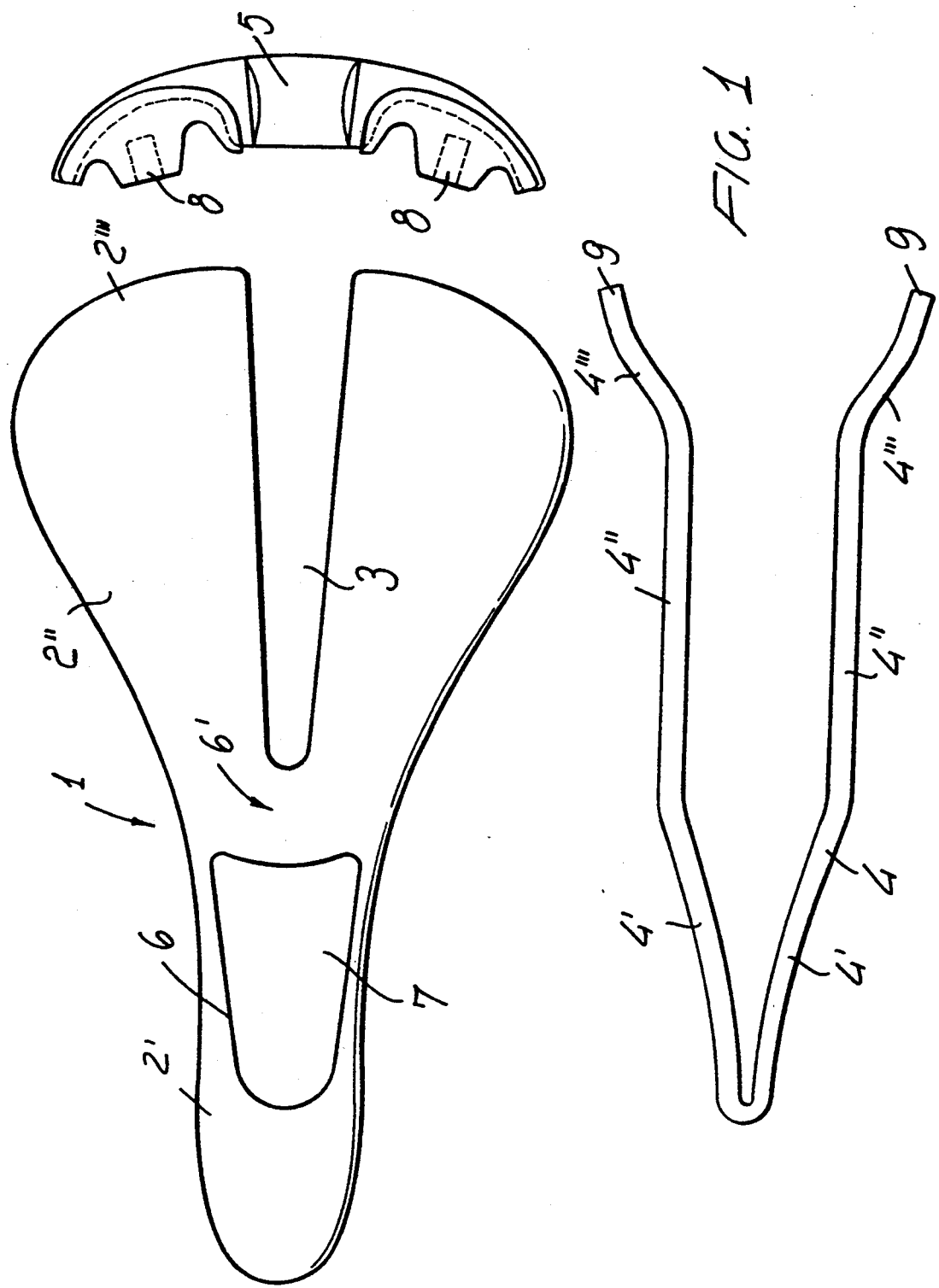
FIG. 1 is a top plan view of the main component element forming the improved saddle for sport bicycles according to the present invention.

With reference to the number references of the figures of the accompanying drawings, the improved saddle for sport bicycles according to the invention, which has been generally indicated at the reference number 1, comprises a contoured body or framework 2 which includes, at a central rear portion thereof, a slot 3 having a set width.

In particular, the framework 2 comprises a front portion 2' having a smaller width merging with an outwardly tapering larger width portion 2" and the slot 3 is a throughgoing slot extending along the longitudinal axis of the framework 2 and having a length substantially corresponding to the longitudinal extension of the saddle larger width portion 2", said slot 3 having the outer end portion thereof defining an interruption of the outer curved profile 2''' of said saddle larger width portion 2".

This slot 3 is a main feature of the present invention since it allows a proper air circulation, while greatly reducing the overall weight of the saddle 1.

Moreover, the slot will provide the saddle with a proper resiliency which will be properly distributed depending on the stress exerted on the saddle.

The framework 2 is made of a molded plastic material and is supported by a curved tubular metal element 4, of any known type, which is provided for connection to a further tubular element to be engaged in the bicycle frame.

More specifically, the curved tubular metal element 4 is provided with a front V shaped narrow portion 4' merging, through a rectilinear middle even width portion, with a rear outwardly diverging portion 4''' provided with two free end portions 9 for affixing the tubular element 4 underside the saddle framework 2, as it will be disclosed thereinafter.

The saddle 1 comprises moreover, as shown, a rear connecting portion or bridge portion 5, which has substantially an arch shaped shape.

This bridge portion 5, which is fixedly restrained at the rear of the framework body and which is provided with recesses 8 therein there are engaged the two end portions 9 of the tubular element 4 will provide, in the meanwhile, the saddle 1 with a good strength, and moreover will provide said saddle with very good resiliency and flexibility characteristics, which can be suitably changed depending on the thickness and type of the materials used for making the saddle framework and bridge portion.

In addition, the above mentioned bridge portion 5 will allow the coating material, generally indicated at the reference number 10, to be properly locked to the framework 2, said coating material comprising, for example, a foamed polyurethane material coated by a leather, artificial leather or other equivalent materials.

For assembling the saddle, in particular, the tubular element 4 is engaged as shown in FIGS. 2 and 3, with its front narrow portion 4' on a lug 6' integral with the saddle body 2 and by engaging its end portions 9 in said recesses 8 of the bridge portion 5 in turn snap engaged from the bottom of the framework 2 with the rear end curved inside portion of the framework 2, the curvature of which will be so designed as to mate with the outer curved profile of the bridge portion 5.

The framework 2 is moreover provided, at its front portion, with a cavity 6 in which can be engaged a rubber material bellows element 7, having resiliency and deformation characteristics greater than those of the framework.

As shown, the cavity 6, which has a width larger than that of the slot 3, is provided on the front of said slot 3, being separated therefrom by a separation region 6' and diverging outwardly, and having a longitudinal axis substantially coinciding with the longitudinal axis of the slot 3.

If desired, the above mentioned bridge portion 5 can also be provided with an inner gasket or seal, made of a resilient material provided for damping the vibrations transmitted from the bicycle frame.

From the above disclosure it should be apparent that the invention fully achieves the intended objects.

In particular, the fact is to be pointed out that the above mentioned bellows element can also be provided at other regions of the saddle, so as to further increase the operation comfort.

The invention as disclosed is susceptible to several variations and modifications, all of which will come within the scope of the inventive idea.

Moreover, all of the details can be replaced by other technically equivalent elements.

In practicing the invention, the used materials, provided that they are compatible to the intended use, as well as the contingent size and shape can be any according to requirements.

I claim:

1. An improved saddle for sport bicycles, comprising a plastic material framework covered by a coating material and supported by a curved tubular element, said framework including a small width front portion merging with a larger width outwardly diverging rear portions wherein in said framework there is defined a throughgoing slot extending along a longitudinal axis of said framework and having a length substantially corresponding to a longitudinal extension of said outwardly diverging rear portion, said slot having an outer end portion thereof defining an interruption of an outer curved profile of said outwardly diverging rear portion, said curved tubular element being provided with a front V-shaped narrow portion merging, through a rectilinear middle even width portion, with a rear outwardly diverging portion having two free end portions, a bridging element being provided having a curved profile mating with said curved profile of said saddle outwardly diverging rear portion for engaging therewith and being provided with two recesses for engaging therein said two free end portions of said rear portion of said tubular element, said saddle framework further including in front of said slot, a cavity having a width larger than the width of said slot and in which is engaged a cushioning element.

2. An improved saddle according to claim 1, wherein said cushioning element is made of a rubber material having resiliency and deformation characteristics greater than those of said saddle framework.

* * * * *